(12) United States Patent
Bidmead et al.

(10) Patent No.: US 12,344,205 B2
(45) Date of Patent: Jul. 1, 2025

(54) HYDRAULIC SYSTEMS

(71) Applicant: Airbus Operations Limited, Bristol (GB)

(72) Inventors: Ashley Bidmead, Bristol (GB); Chris Wootton, Bristol (GB)

(73) Assignee: Airbus Operations Limited, Bristol (GB)

( * ) Notice: Subject to any disclaimer, the term of this patent is extended or adjusted under 35 U.S.C. 154(b) by 0 days.

(21) Appl. No.: 18/383,181

(22) Filed: Oct. 24, 2023

(65) Prior Publication Data

US 2024/0140382 A1     May 2, 2024

(30) Foreign Application Priority Data

Oct. 28, 2022 (GB) ..................................... 2215981

(51) Int. Cl.
    *B60T 13/12*     (2006.01)
    *B64C 25/22*     (2006.01)
    *B64C 25/44*     (2006.01)
    *F15B 13/06*     (2006.01)

(52) U.S. Cl.
CPC .............. *B60T 13/12* (2013.01); *B64C 25/22* (2013.01); *B64C 25/44* (2013.01); *F15B 13/06* (2013.01)

(58) Field of Classification Search
CPC ........ B60T 8/1703; B64C 25/22; B64C 25/44
See application file for complete search history.

(56) References Cited

U.S. PATENT DOCUMENTS

| | | | | |
|---|---|---|---|---|
| 2,377,115 | A * | 5/1945 | Van Der Werff | B64C 25/22 91/530 |
| 4,007,970 | A * | 2/1977 | Romero | B60T 8/1703 303/20 |
| 11,021,237 | B2 * | 6/2021 | Tarantino | B64C 25/42 |
| 2010/0292889 | A1 * | 11/2010 | Cahill | B60T 8/885 701/29.1 |
| 2012/0133200 | A1 * | 5/2012 | Oyama | B60T 13/12 303/10 |
| 2019/0308718 | A1 | 10/2019 | Jones | |

FOREIGN PATENT DOCUMENTS

| | | |
|---|---|---|
| EP | 1080009 B1 | 12/2002 |
| GB | 125573 A | 4/1919 |
| GB | 732857 A | 6/1955 |

(Continued)

OTHER PUBLICATIONS

European Search Report for Application No. 232052647 dated Mar. 12, 2024.

(Continued)

*Primary Examiner* — Thomas E Lazo
(74) *Attorney, Agent, or Firm* — KDW Firm PLLC (57) ABSTRACT

A hydraulic brake system for activating the wheel brakes of an aircraft landing gear assembly includes a hydraulic fluid supply line and an associated return line. There is a valve which separates a source of hydraulic fluid from a portion of the return line and an associated leak path associated with the valve that in use maintains the pressure and/or volume of hydraulic fluid in the portion of the return line above a minimum acceptable level. The leak path may be provided by a hole drilled in a part (e.g. the poppet) of a non-return check valve.

16 Claims, 5 Drawing Sheets

(56) References Cited

FOREIGN PATENT DOCUMENTS

| | | |
|---|---|---|
| GB | 1220961 A | 1/1971 |
| GB | 1255735 A | 12/1971 |
| GB | 2586790 A | 3/2021 |
| WO | 2021037829 A1 | 3/2021 |

OTHER PUBLICATIONS

British Search Report for Application No. 2215981 dated Apr. 14, 2023.
Supplemental British Search Report for Application No. 2215981 dated Oct. 20, 2023.
British Search Report for Application No. 2215981 dated Oct. 10, 2023.

* cited by examiner

HYDRAULIC SYSTEMS

TECHNICAL FIELD

The disclosure herein relates to hydraulic systems.

The present disclosure concerns the operation of hydraulic systems. More particularly, but not exclusively, this present disclosure concerns a method of using a hydraulic sub-system, such as a brake system, on an aircraft. The present disclosure also concerns a hydraulic brake system for activating the wheel brakes of an aircraft, and other related subject matter.

Figure 1:
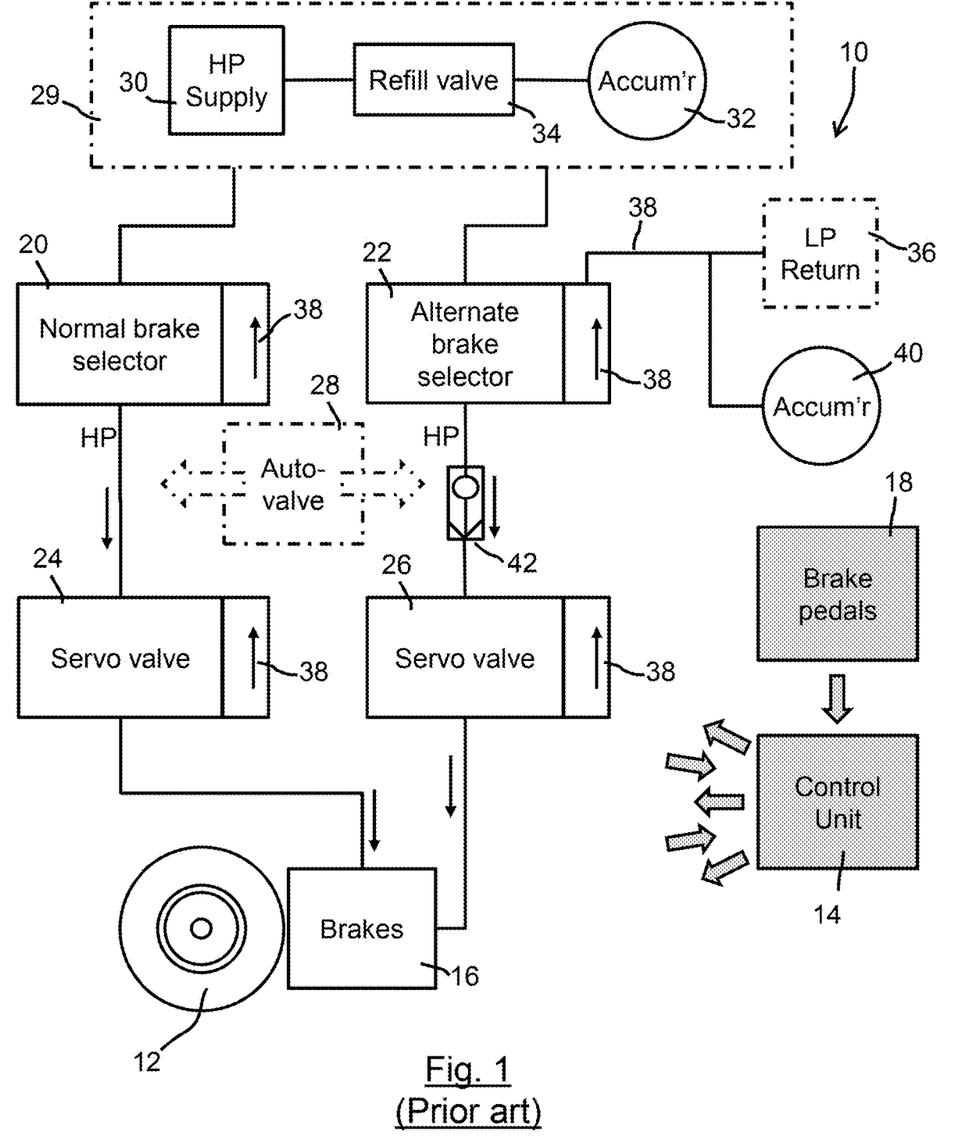
FIG. 1 shows a braking system of the prior art.

FIG. 1 shows, schematically, a brake system 10 for the wheels 12 of an aircraft (not shown separately in FIG. 1) of the prior art (for example an Airbus A350 aircraft—referred to below simply as an "A350"). A control unit 14 controls the action of various valves in order to provide for braking of the wheels of the aircraft. The brakes 16 are actuated hydraulically, under the action of hydraulic fluid which is controlled by a hydraulic circuit. Parts only of a typical hydraulic circuit of the A350 are shown in FIG. 1. The hydraulic circuit provides for redundancy in the braking system, in that there is a normal braking system and an alternate braking system, and also two different supplies of hydraulic power (referred to, in the context of the A350, by the labels "yellow" hydraulic system and "green" hydraulic system—not shown separately in FIG. 1).

BACKGROUND

In normal circumstances, when a pilot of the aircraft commands action of the brakes 16 by depressing a brake pedal 18, the control unit 14 causes the valves of the hydraulic circuit to operate in a manner which causes high pressure ("HP") hydraulic fluid to move the brakes 16 into an engaged position in which a braking force is applied to the wheel(s) 12. In such a normal braking configuration, the normal brake selector valve 20 is in its normal braking configuration (with the alternate brake selector valve 22 being in a position which allows for normal braking), and the associated servo valve 24 is operable to control the level of braking required.

In circumstances where normal braking is unavailable, or where alternate braking is otherwise required, the alternate braking parts of the hydraulic circuit are activated, including the alternate brake selector valve 22 and the associated servo valve 26. Optionally, this may be something that is automatically selected by an (optional) automatic valve 28, that operates if the normal braking side of the circuit has a loss of pressure for example. Both the normal and alternate brake circuits are fed with high pressure hydraulic fluid from a supply 29. The supply includes a reservoir 30 of fluid, hydraulic pumps (not shown) for pressuring the fluid, and an accumulator 32 to help regulate hydraulic volume/pressure. Thus, the alternate brake circuit at least may be powered with fluid under pressure maintained by the accumulator 32. That accumulator 32 may itself be pressurized and filled with hydraulic fluid, as and when required, via a dedicated refill valve 34. Return lines 38 (not all of which being shown in FIG. 1) for the releasing of pressure from the brakes 16 are provided. There may be return line paths 38 associated with each of the selector valves and servo valves too for example. Hydraulic fluid passes via the return lines 38 through the valves, at lower pressure, to the aircraft's hydraulic circuits (shown schematically by the "LP Return" box 36 in FIG. 1). It will be appreciated that in certain aircraft the return lines share pipes that are used as supply lines, for example locally to the brakes. An accumulator 40 is provided for regulating the amount of fluid in the return line. Check valves are present in the system (not shown in FIG. 1). A park brake sub-system is also provided (not shown in FIG. 1).

An automatically-resetting hydraulic fuse 42 is supplied in the high pressure line between the alternate brake selector valve 22 and the associated servo valve 26. The fuse 42 trips in the event of atypical high flow of fluid that would be suggestive of a fault in the system, such as a fractured pipe or other leak for example.

The function of the alternate brake system is routinely checked, typically as part of a pre-land test. This may be at least partially automated, and/or undertaken by flight crew as part of standard procedures. It has been observed that testing of the alternate brake system results in false reports of system faults and/or reports of faults more frequently than would be ideal. The tripping of the hydraulic fuse 42 is an example of how such faults, whether false or otherwise, may be detected. It is of course of the utmost importance for standard and routine system tests to detect faults reliably. However, having more false (or avoidable) fault reports than desirable, may cause delays in operations and/or extra potentially unnecessary maintenance time that could be mitigated if a more accurate/reliable testing regime were implemented and/or if an improved braking system were provided.

Faults with the hydraulic system in an aircraft may result for various reasons including failure of parts of the hydraulic system and/or damage caused by debris or objects impacting against one or more pipes that carry hydraulic fluid. Such faults can result in the leakage of fluid. To mitigate against such leaks and to reduce the risk of depletion of the hydraulic system, measures may be employed—such as the installation of check valves and/or hydraulic fuses—to ensure that as many hydraulic systems as possible remain operational, despite the occurrence of a leaking pipe for example in a part of the system. As a result of fluid dynamics, the effects of extreme temperature variations and movement that an aircraft typically endures, the inventor has realised that such measures can contribute to problems associated with cavitation (i.e. there being cavities in the lines, for example as bubbles, vacuums, or other pockets that are empty of hydraulic fluid) within the hydraulic lines. This can cause system misbehaviors under nominal conditions (i.e. with no failures) leading to the false reporting/detecting of faults. Cavitation in the lines may also affect the efficient or proper operation of the hydraulic system for its intended purpose. Removing protective measures such as check valves and/or hydraulic fuses runs the risk of losing the protection against a fractured or burst pipe or severe leak in the system.

The present disclosure seeks to mitigate one or more of the above-mentioned problems. Alternatively or additionally, the present disclosure seeks to provide an improved brake system for an aircraft.

SUMMARY

The present disclosure provides, according to a first aspect, a hydraulic brake system for activating one or more wheel brakes of an aircraft. The brake system comprises a supply line and a corresponding return line. There may be more than one supply line and more than one return line. Hydraulic fluid is supplied, via the supply line, to one or more brakes. The wheel brakes are arranged, under the action of the hydraulic fluid so supplied, to apply a braking force to the wheels of the aircraft. The wheels form part of a landing gear assembly of the aircraft. Hydraulic fluid flows, via the return line, from the wheel brakes. The brake system includes a valve which separates a source of hydraulic fluid, for example under higher pressure, from at least a portion of the return line, for example containing hydraulic fluid at a lower pressure. The valve may for example provide the function of a one-way check valve (i.e. non-return valve) which resists the flow of fluid in a first direction via the valve while allowing high flow rates of hydraulic fluid in a second direction via the valve, the second direction being opposite to the first direction. In accordance with the present disclosure, there is provided a leak path which is associated with the valve that in use maintains the pressure and/or volume of hydraulic fluid in the portion of the return line above a minimum acceptable level. The provision of such a leak path thus reduces the risk of undesirable cavitation in the return line. The leak path need not however enable a very high flow of fluid to the return line. Thus, it is possible in embodiments of the present disclosure to engineer the leak path such that, in the event of an unintentional leak elsewhere in the system, depletion of hydraulic fluid via the leak path is not possible over a single flight operation (i.e. including a single take-off, flight to a set destination, and a single landing). The valve may thus perform the function of a check valve while not contributing to problems associated with, or the causes of, cavitation in a way that a standard non-return valve would.

The minimum acceptable level of the pressure of hydraulic fluid in the portion of the return line may be a percentage of the normal expected level of the pressure. For example, the minimum acceptable level of the pressure may be 50% of the normal expected level of the pressure (possibly 80%). The minimum acceptable level of the pressure may be a pressure that is at least 3 bar, possibly at least 4 or 5 bar. The minimum acceptable volume of hydraulic fluid in the portion of the return line may be a percentage of the normal expected volume, for example 90% of the normal volume (possibly 95%). The need for maintaining the pressure and/or volume of hydraulic fluid in the portion of the return line above a minimum level, may be limited to certain times of operation (i.e. immediately before the brake systems is needed). Thus, it may be that the leak path need only maintain the pressure and/or volume of hydraulic fluid in the portion of the return line above such a minimum acceptable level at those times, it being permissible for the pressure and/or volume of hydraulic fluid to drop below the minimum level at other times.

Conveniently, the leak path may be directly associated with the valve, such that it is for example locally provided. It may be that the leak path forms part of the valve. For example, it may be that the valve has a body, and the leak path is at least partly contained within the body of the valve. For example, the valve may have a valve member (e.g. a poppet) which cooperates with a valve seat when the valve is in its closed position (e.g. to close off an opening that would otherwise allow fluid flow—such that there is a corresponding open position in which the valve member lifts off the seat to allow the passage of fluid via the opening) and the leak path is at least partly contained within the valve member—for example being a passage that is specially machined into the valve member.

The valve may be a one-way check valve, for example a valve that protects against hydraulic fluid flowing into the return line from a source of hydraulic fluid. The valve may be located in a part of the return line that is in direct fluid communication with a return line accumulator. The valve, e.g. when in the form of a one-way check valve, may be located in a part of the return line in a location such that a brake selector valve is located on a hydraulic fluid path between the valve (with the leak path) and the brakes. A one-way check valve (even when associated with a leak path) may reduce the risk of loss of hydraulic fluid from other parts in fluid communication with the return line on the other side of the check valve in the event of an unintentional leak existing in the brake system, for example between and including the brakes and the brake selector valve. There may be a park brake selector valve located on a hydraulic fluid path (e.g. a low pressure fluid path) between the valve with the leak path and the brakes. Additionally or alternatively, there may be a brake selector valve (for braking on landing, not being the park brakes, for example normal braking or alternate braking) located on a hydraulic fluid path (e.g. a low pressure fluid path) between the valve with the leak path and the brakes.

As mentioned above, the leak path may be engineered specifically to provide sufficient flow of fluid to reduce the risk of cavitation in the return line. It is preferred for such flow to be possible at both low pressure differentials across the valve and at high pressure differentials (e.g. at both pressure differentials of the order of ~1 bar and at pressure differentials of the order of ~5 bar and higher). It is also desirable to ensure that the leak path does not risk unintentional loss of fluid from the system to an extent that would prejudice safety. It is desirable to ensure that during a flight the hydraulic system is protected and therefore the flow rate is sufficiently low to maintain aircraft hydraulics. For example, it may be that the valve is so configured that, during a complete flight (i.e. including take-off, flying to destination, and landing), the amount of fluid able to flow in a single direction via the leak path would, at its greatest, be less than substantially all of, preferably less than 75% of, and optionally less than a half of, the difference between the minimum safe level of hydraulic fluid that is required in order for the aircraft to be permitted to take-off and the recommended level of hydraulic fluid so required. It is preferred for the amount of fluid able to flow in a single direction via the leak path during a complete flight to be less than the minimum amount of fluid that, if completely lost from the system, would render the hydraulic system inoperable (and optionally no more than half of, or 75% of, that amount of fluid). Similarly, it is preferred for the flow rate to be engineered such that the maximum amount of fluid that could be lost as a result of flow via the leak path is less than substantially all of, preferably less than 75% of, and optionally less than a half of, the maximum amount of hydraulic fluid that could be safely lost. Preferably, the valve is so configured to so limit the amount of fluid flowing in this way, when the complete flight is the longest flight achievable with the aircraft in normal operations (i.e. with an average or typical payload and overall weight and being the longest flight that would ever likely be taken with the aircraft in practice).

In embodiments, the brake system will typically be in fluid communication with a reservoir of hydraulic fluid. It may be that the brake system also forms part of a larger hydraulic system also in fluid communication with such a reservoir of hydraulic fluid. The average rate of flow via the leak path associated with the valve (i.e. in normal use) may be considered as being Y liters/second. It may be that Y is $10^{-5}$ X liters per second or less (possibly less than $5 \times 10^{-6}$ X liters per second and optionally less than $10^{-6}$ X liters per second), where X is related to the volume of hydraulic fluid of the larger hydraulic system. For example, X may be equal to the volume in liters of the capacity of the reservoir of hydraulic fluid—or a fraction thereof, for example a fifth or a quarter or a third. Alternatively, X may be equal to the volume in liters of the capacity of the larger hydraulic system including the reservoir of hydraulic fluid—or a fraction thereof, for example a fifth or a quarter or a third. X may be the maximum amount of hydraulic fluid that could be safely lost. X may be ~5 liters, for example. Over a 12 hour period where the average rate of flow via the leak path is $10^{-5}$ X liters per second, the total volume of flow would be equal to about 43% of X. Thus, even if all the fluid flowing in that direction via the valve were lost over that time, more than half would remain. Above, there is discussion of the flow rate of the leak path, Y, being less than an upper limit, defined in various ways. There needs however to be a non-negligible flow allowed via the leak path. It may be that Y>1% of the upper limit, and possibly Y>5% of the upper limit.

It may be that the average rate of flow Y liters/second via the leak path associated with the valve (i.e. in normal use) is such that Y is greater than $10^{-5}$ Z liters per second (preferably greater than $5 \times 10^{-5}$ Z liters per second, and optionally greater than $10^{-4}$ Z liters per second), where Z is a measure of the amount of fluid required in a part of the system to be fed by the valve in order to maintain the pressure and/or volume of hydraulic fluid in the portion of the return line above the minimum acceptable level. Z may for example be the maximum volume of hydraulic fluid that the return line can hold. Z may be the normal operating capacity of the return line. Z may be the volume of fluid that would be in the portion of the return line—and any associated components in that portion that are in fluid communication with the valve—from the brakes to the valve, if completely full. It will be understood that in a case where an average rate of flow of $5 \times 10^{-5}$ Z liters per second (~$3 \times 10^{-3}$ Z liters per minute) is maintained for 5½ hours, the volume of fluid supplied via the leak path will be ~Z liters. Such a flow rate would be relatively low compared to the peak flow rates via the valve when opened which are typically of the order of many liters per minute.

The average flow rate via the leak path associated with the valve may be chosen such that it is less than W, where W is equal to the lowest safe value that can be used as the volume of hydraulic fluid that can be lost in a single flight divided by the time of the longest flight likely to be taken by the aircraft in its lifetime.

For the leak path to allow sufficient flow to have a practical impact on reducing cavitation risk, while retaining the ability of the valve to reduce the risk of complete depletion of hydraulic fluid in the event of a significant leak in the system upstream of the valve, it may be that the afore-mentioned variables W, X, Y and Z satisfy one or more of the following equations:

$$5 \times 10^{-5} Z \text{ liters per second} < Y < 10^{-5} X \text{ liters per second},$$

$$10^{-4} Z \text{ liters per second} < Y < 2 \times 10^{-6} X \text{ liters per second},$$

$$10^{-8} X \text{ liters per second} < Y < 3 \times 10^{-6} X \text{ liters per second},$$

$$10^{-4} Z \text{ liters per second} < Y < W, \text{ and}$$

$$10^{-8} X \text{ liters per second} < Y < W.$$

The present disclosure also provides an aircraft incorporating an embodiment of the present disclosure. For example the aircraft may include a hydraulic brake system of the present disclosure. The aircraft will typically comprise a retracting landing gear assembly, which may be retracted with the use of a hydraulic system. Retracting the landing gear can utilize significant amounts of power from a hydraulic system, which if shared with a brake system for powering hydraulic brakes can have various effects on the brake system, in a way which makes the present disclosure particularly beneficial.

The present disclosure may have particular benefit in a case where the aircraft includes a larger hydraulic system and a shared reservoir of hydraulic fluid. For example the reservoir of hydraulic fluid may be in fluid communication with both the hydraulic brake system and the larger hydraulic system. Such a larger hydraulic system is configured for hydraulically powering a part of the aircraft not being a wheel braking system. For example, the larger hydraulic system may be configured for hydraulically powering a control surface of the aircraft, such as ailerons, an elevator, a rudder, a slat, a flap, a spoiler, a wing tip device or the like. Additionally, or alternatively, the larger hydraulic system may be configured for hydraulically powering the deployment (e.g. extension) of and/or stowage (e.g. retraction of) a landing gear assembly of the aircraft or other parts of the aircraft that deploy and stow (or open and close) such as a door, including a door to the landing gear bay that when open permits passage of the landing gear. Additionally, or alternatively, the larger hydraulic system may be configured for hydraulically powering the steering of, or powering of, a landing gear wheel—for example of a nose landing gear.

The present disclosure may have application in relation to hydraulic systems or sub-systems not being a hydraulic brake system. Also, there may be applications for preventing, or reducing the risk of, cavitation in hydraulic pipes or other components not being a return line. The present disclosure thus further provides an aircraft including a hydraulic sub-system for supplying hydraulic power to a part of the aircraft (e.g. the wheel brakes), the hydraulic sub-system including a one-way check valve which resists the flow of fluid in a first direction via the valve while allowing high flow rates of hydraulic fluid in a second direction via the valve, the second direction being opposite to the first direction. A leak path may be provided that allows flow of fluid in the first direction, through the valve and/or bypassing the valve, at a rate that is sufficient to reduce the risk of cavitation in a portion (e.g. a pipe) of the hydraulic sub-system but low enough such that the check valve still provides adequate protection against faulty leaks. Such a check valve should provide adequate protection in a notional scenario where there is a faulty leak in the hydraulic sub-system such that both (a) the check valve, had it included no intentional leak path, would have provided adequate protection against the faulty leak and (b) had the check valve included no restriction of flow of hydraulic fluid in the first direction the faulty leak would render the hydraulic sub-system inoperable. It will be understood that the high flow rates of hydraulic fluid in the second direction via the valve are high in the sense that they are higher (preferably significantly higher) than the flow rates via the check valve in the first direction.

The aircraft of embodiments of the present disclosure may have a first hydraulic system, and a second hydraulic system, provided as an alternate system which provides redundancy. The first hydraulic system may for example be arranged to power various parts of an aircraft including one or more control surfaces and one or more wheel brakes. The second hydraulic system may be arranged to power various parts of the aircraft including one or more control surfaces (some possibly being in common with those powered by the first hydraulic system, but not necessarily all being in common) and one or more wheel brakes (at least some, and preferably all, being in common with those powered by the first hydraulic system).

Thus, in embodiments relating to wheel brakes, the brake system of the aircraft may comprise a primary brake sub-system and a secondary brake sub-system. The secondary brake sub-system may be provided as an alternate brake sub-system to provide redundancy in the overall braking system of the aircraft. Embodiments of the present disclosure may be of particular benefit in relation to such a secondary brake sub-system. In embodiments, this may be advantageous because an alternate brake sub-system may be more prone to problems associated with cavitation of the return lines in the brake system.

The aircraft may be a passenger aircraft. The passenger aircraft preferably comprises a passenger cabin comprising a plurality of rows and columns of seat units for accommodating a multiplicity of passengers. The aircraft may have a capacity of at least 20, more preferably at least 50 passengers, and more preferably more than 50 passengers. The aircraft may be a commercial aircraft, for example a commercial passenger aircraft, for example a single aisle or twin aisle aircraft. The aircraft need not be configured for carrying passengers, but could for example be an aircraft of an equivalent size configured for cargo and/or used on a non-commercial basis. The aircraft may have a maximum take-off weight (MTOW) of at least 20 tonnes, optionally at least 40 tonnes, and possibly 50 tonnes or more. The aircraft may have an operating empty weight of at least 20 tonnes, optionally at least 30 tonnes, and possibly about 40 tonnes or more.

There is also provided a method of using a hydraulic sub-system on an aircraft. The hydraulic sub-system may be a hydraulic system or sub-system of the present disclosure. The hydraulic sub-system forms part of a larger hydraulic system of the aircraft and typically shares a common reservoir of hydraulic fluid. The larger hydraulic system is used to power one or more parts of the aircraft not being powered by the hydraulic sub-system. For example the hydraulic sub-system may be a brake system for powering wheel brakes, whereas the larger hydraulic system is configured for hydraulically powering a control surface, deployment/stowage of a landing gear assembly/door, and/or steering of, or powering of, a landing gear wheel. The hydraulic sub-system includes a supply line for supplying hydraulic fluid, under high pressure for example, to one or more hydraulic powered parts of the aircraft. The hydraulic sub-system includes a corresponding return line for returning hydraulic fluid from one or more hydraulic powered parts, for example back to the common reservoir. The hydraulic sub-system includes a valve for controlling flow of hydraulic fluid within the sub-system.

The method of using the hydraulic sub-system, in accordance with this particular aspect of the present disclosure, comprises both powering, with the use of hydraulic fluid under pressure supplied via the supply line, the one or more hydraulic powered parts and then relieving hydraulic pressure. Particularly when the pressure is relieved, there may be flow of hydraulic fluid in one direction via a valve. The method also comprises a step (before and/or after), during which the hydraulic fluid in the hydraulic sub-system is not powering such hydraulic powered parts, and during which the valve resists, but does not prevent completely, the flow of fluid in the opposite direction via the valve. Thus the valve may advantageously allow sufficient leakage in the opposite direction to reduce the risk of cavitation in the return line when the hydraulic sub-system is used (e.g. next used) to power the one or more hydraulic powered parts.

The present disclosure also provides a method of making a valve for use as the valve of any aspect of the present disclosure. Such a method may for example comprises a step of machining (e.g. drilling a hole) or otherwise forming a fluid path in a valve member (e.g. poppet) of a valve to create at least part of the leak path.

It will of course be appreciated that features described in relation to one aspect of the present disclosure may be incorporated into other aspects of the present disclosure. For example, the method of the present disclosure may incorporate any of the features described with reference to the apparatus of the present disclosure and vice versa.

BRIEF DESCRIPTION OF THE DRAWINGS

Embodiments of the present disclosure will now be described by way of example only with reference to the accompanying schematic drawings of which.

DETAILED DESCRIPTION

Figure 2:
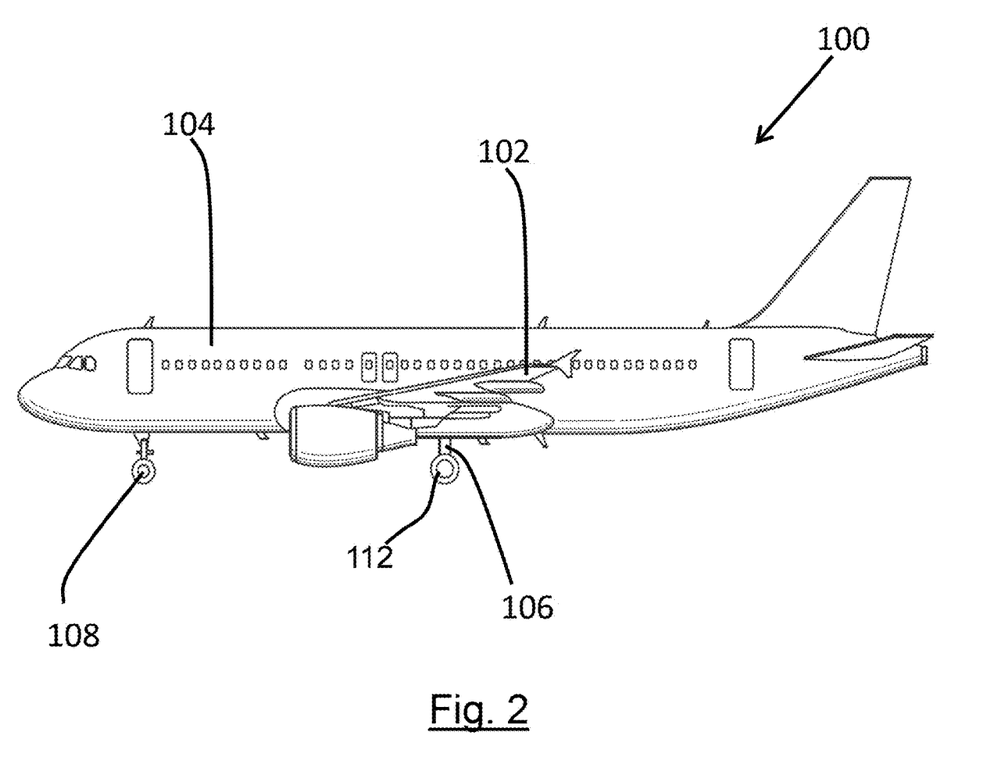
FIG. 2 shows an aircraft having a landing gear wheel that is associated with a braking system according to a first embodiment of the present disclosure.

FIG. 2 shows an aircraft 100 comprising a pair of wings 102 and a fuselage 104. The aircraft 100 is supported on the ground by two main landing gear assemblies (MLG) 106 and a nose landing gear assembly (NLG) 108. The MLG has wheels 112 which include brakes that are operated by a braking system of an embodiment of the present disclosure.

Figure 3:
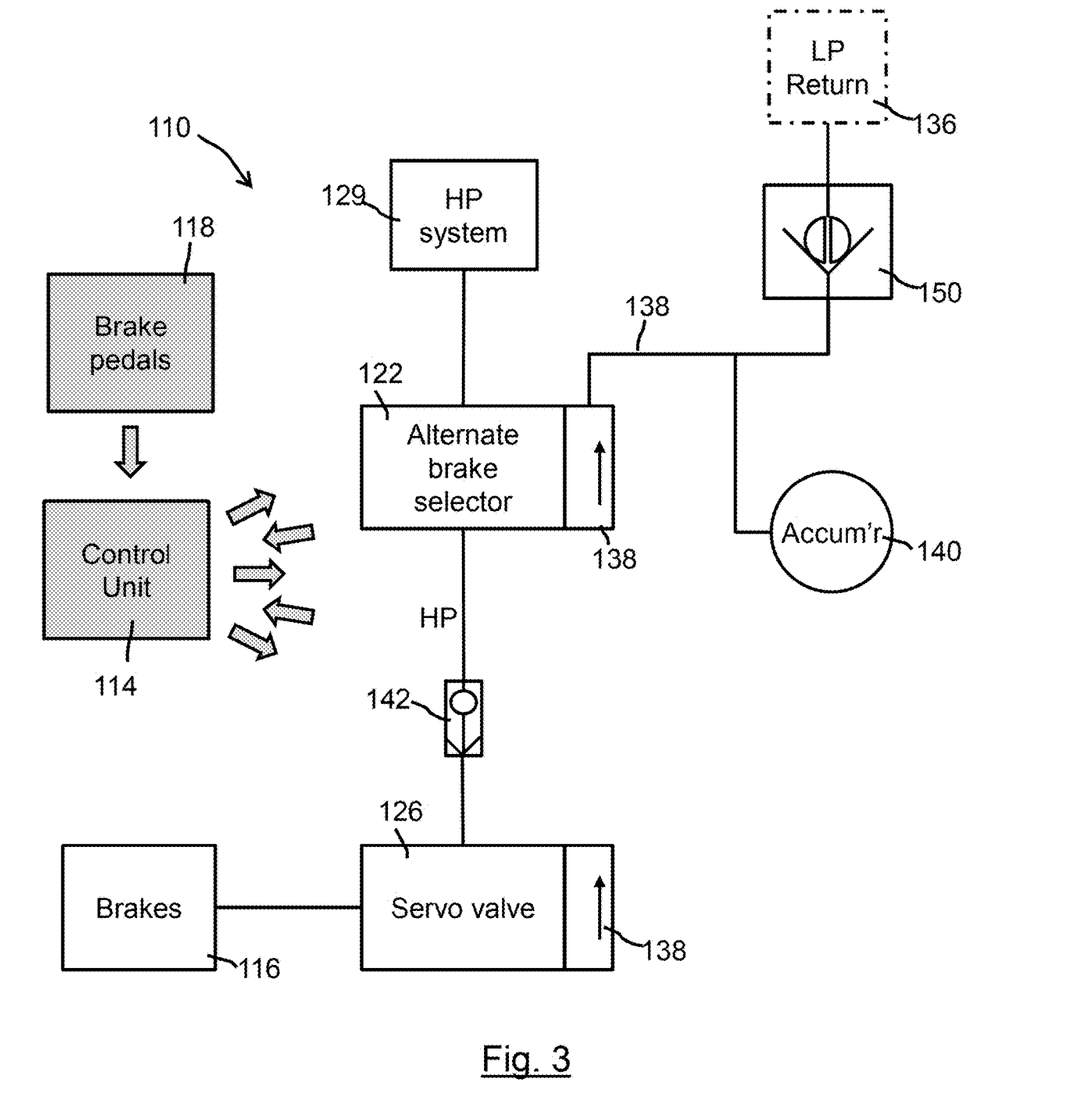
FIG. 3 shows in more detail the braking system of the first embodiment.

The braking system of a first embodiment is shown in FIG. 3. It has a similar configuration to the prior art system shown in FIG. 1 and described earlier. Similar reference numbers are used for similar parts, but preceded by the number "1" such that for example the brakes 16 of FIG. 1 correspond to the brakes 116 of FIG. 3. The hydraulic circuit provides for redundancy in the braking system in that there is a normal braking system (omitted from FIG. 3) and an alternate braking system. The hydraulic circuit shown in FIG. 3 forms part of a larger hydraulic system of the aircraft, which controls other hydraulic equipment (not shown) and functions, such as landing gear retraction. The larger hydraulic system comprises separate and independent hydraulic circuits, such as the yellow and green systems mentioned above.

FIG. 3 shows the alternate brake system primarily. A control unit 114 controls the action of the alternate brake selector valve 122 and the associated servo valve 126 in order to hydraulically actuate wheel brakes 116 and provide alternate braking. A pilot of the aircraft may command action of the brakes 116 by depressing a brake pedal 118. In use, pressure in the hydraulic fluid may be released via return line paths 138 (not all of which being shown in FIG. 3). There are return line paths 138 associated with both the alternate selector valve 122 and alternate servo valve 126. Hydraulic fluid passes via the return lines 138 to the aircraft's hydraulic circuits (shown schematically by the "LP Return" box 136 in FIG. 3). The hydraulic return 138 is connected to the aircraft's hydraulic circuits via a check valve 150. There is a return line accumulator 140. An automatically-resetting hydraulic fuse 142 is supplied in the high pressure line between the alternate brake selector valve 122 and the associated servo valve 126.

In accordance with the present embodiment, the check valve 150 in the return line (between the brake selector valve 122 and the LP return 136, and also in direct fluid communication with the accumulator 140) is engineered to include a leak path. This may be achieved by drilling a hole of a pre-set size in the poppet of a non-return check valve of a type that would normally be used at the location of check valve 150. (The valve seat on which the poppet sits when the valve is in its closed position may remain unchanged.)

As a result of there being a low flow rate path for fluid to travel in the reverse direction along the return path 138 the chance of the return line being unintentionally left inadequately filled with hydraulic fluid is reduced. This can then have the advantage of preventing the system from testing itself in what might otherwise be a cavitated state. This in turn reduces the chance of spurious alerts/spurious system level sanctions, such as the tripping of the hydraulic fuse 142. There is also the advantage of preventing the system from being used for braking in what might otherwise be a cavitated state. The inventor has appreciated that the equivalent system of the prior art can have spurious tripping events as a result of circumstances in which the flow into the supply line is temporarily extremely high as a result of the hydraulic pressure being very low (lacking in fluid) as a result of being connected to the return line.

The inventor has also realised that the complexity, layout of hydraulic lines, extreme pressure variations and occasional high demands on the hydraulic circuit of a typical medium to large commercial aircraft can allow greater risk of cavitation particularly in the return lines. For example, in flight, the braking system is not used and the temperature variations, vibrations and previous operations can cause the lines to be, or to become, cavitated over time, as a result of the hydraulic systems that are typically used on an aircraft.

The size of the hole in the poppet needs to be carefully chosen so as to ensure that it is small enough that the leak path via the hole would not be sufficient to enable depletion of hydraulic fluid during a single flight to the extent that would render the hydraulic system inoperable. On an A350, the whole of the larger hydraulic system to which the braking system of FIG. 3 would belong might have a reservoir of a volume of the order of 20 liters. The system is still operable in the event that 5 liters is lost (i.e. about 25% of the total amount of fluid available), but possibly not if significantly more than ten liters were lost. The size of the hole in the poppet is therefore chosen such that less than 5 liters of fluid could flow via the leak path in the non-return direction during a single flight. The average rate of flow rate via the leak path over a period of 20 hours (that being longer than most typical flight times) is thus chosen to be less than 0.07 ml liters per second (about 4 ml per minute). This is because, over a time of 20 hours the greatest amount of fluid that could leak via the valve 150, for example in the event of a pipe rupture that would otherwise be substantially completely isolated by the valve, would be ~5 liters, if there was a leak at a rate of 0.07 ml liters per second. A maximum flow rate allowed via the leak path of 0.07 ml liters per second, is equal to $1.4 \times 10^{-5} \times 5$ liters per second (where 5 liters is the amount of hydraulic fluid that can be lost while still maintaining the operability of the hydraulic system) and also equal to $3.5 \times 10^{-6} \times 20$ liters per second (where 20 liters is the volume of the hydraulic fluid in the bigger hydraulic circuit to which the braking system is attached). The region of the return line 138 protected by valve 150 (including the hydraulic fluid held in components in fluid communication with the return line that might also suffer from cavitation issues) has the capacity to hold a volume of hydraulic fluid of the order of 0.2 liters (200 ml). Thus, at a flow rate of about 0.02 ml per second it will be appreciated that just over a third of the entire circuit defined by the return line could be reverse filled via the leak path in an hour. Of course, it would be highly unlikely in flight for the entire circuit to deplete without warning, so the ability to replenish 50% of the circuit within 8 hours could be considered adequate—that would equate to a minimum flow rate needed of 0.0035 ml per second—which is equal to $1.7 \times 10^{-5} \times 0.2$ liters per second (where 0.2 liters is the volume of hydraulic fluid held in the return line when full). In the present embodiment, the leak flow rate is engineered so that no more than 3 liters of fluid can flow via the leak path in the non-return direction over a typical 20 hour flight—i.e. such as a flow rate of about 0.03 ml per second ($=3 \times 10^{-5}$ liters per second). At such a value it will be understood that this is both greater than $10^{-4} \times 0.2$ liters per second ($=2 \times 10^{-5}$ liters per second) and greater $10^{-8} \times 20$ liters per second ($=2 \times 10^{-7}$ liters per second) and also less than $2 \times 10^{-6} \times 20$ liters per second ($=4 \times 10^{-5}$ liters per second).

It will be appreciated that the valve 150 allows flow along the return path 138 from the brakes 116 to the LP return 136 at a relatively high flow rate. The valve allows relatively free flow in this direction and can allow flow of hydraulic fluid at a peak flow rate of over 10 liters per minute (i.e. >0.16 liters per second), whereas—as indicated above—flow in the opposite direction is restricted. The valve 150 may therefore be considered as a one-way leaky check valve.

Figure 4:
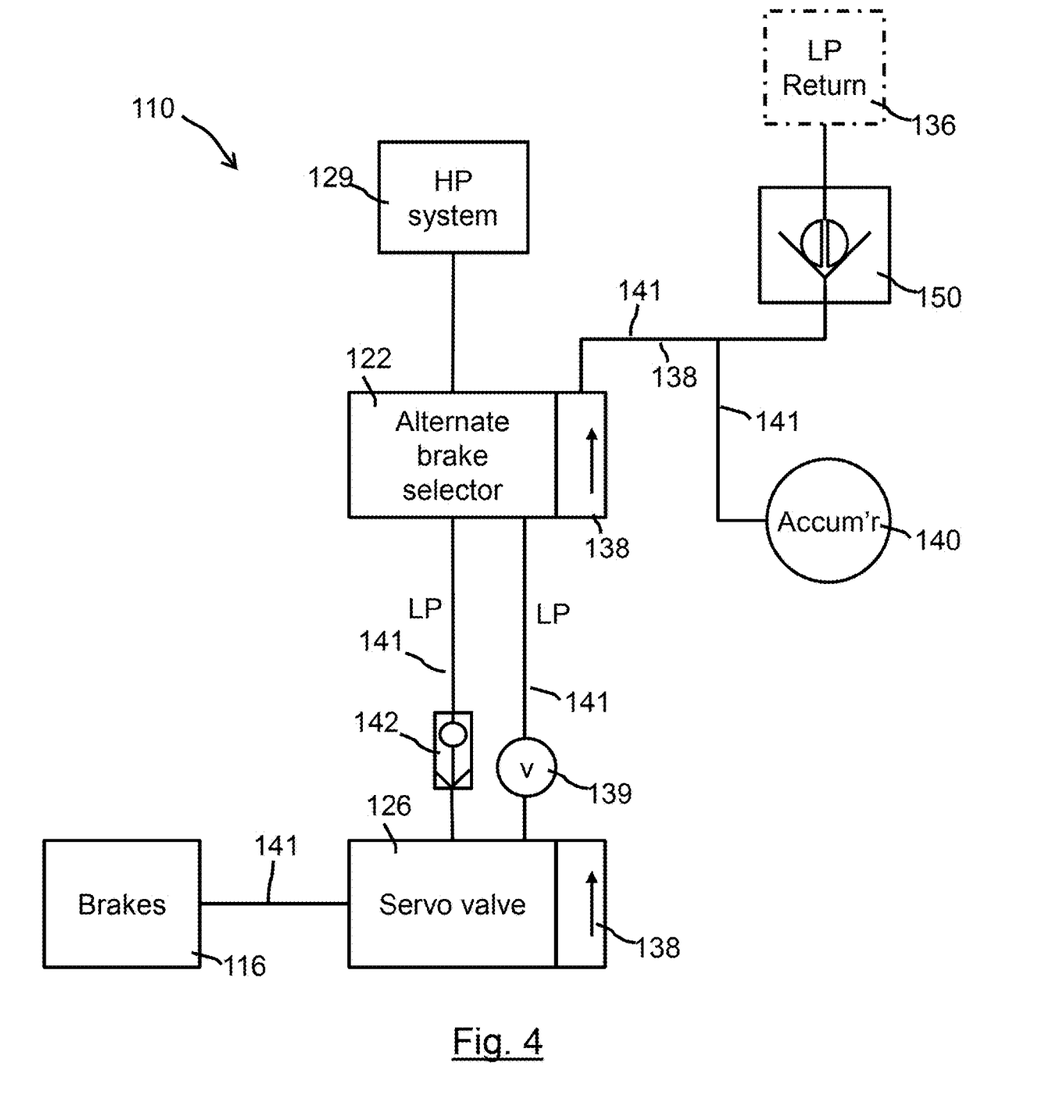
FIG. 4 shows some of the low pressure paths of hydraulic fluid in the braking system of the first embodiment.

FIG. 4 illustrates schematically the presence of various low pressure routes 141 that exist in practice, despite the presence of various check valves/non-return valves 139 including check valve 150. Such check valves typically require at least 1 bar pressure difference before they will reliably stop flow in the non-return direction. At low pressures, in the return lines, of say 5 bar or below, pressure fluctuations can often mean that local pressure is of the order of 1 bar, resulting in the check valves allowing some reverse flow. With hydraulic fluid being allowed to flow in directions, and along paths, that are not intended, there can be an increased risk of cavitation in the return line, resulting in unusual behaviors. For example, when there is cavitation in the return line 138 there can be a relatively high impulse flow via the fuse 142 between the alternate brake selector valve 122 and the alternate servo-valve on the high pressure line. Such a high impulse flow through the fuse (being a flow rate or volumetric fuse, not directly pressure driven) can cause the fuse to trip, even though the exceptionally high flow rate is sustained for only a relatively short period of time. This then causes the system to indicate a fault. Such problems can for example occur during landing gear retraction when hydraulic loads are particularly high and when the return pressure on the return line 138 reaches zero or close to zero due to the check valves 139 installed on the low pressure routes. Hydraulic fluid can effectively be sucked out of the return line unintentionally. Valve chatter at low pressures can also contribute to, and/or cause, cavitation issues. The valve 150 with its intentional leak path that allows reverse flow of hydraulic fluid into the return lines, without needing a particularly high pressure difference, counteracts the instances where fluid might otherwise be lost from the return line via one of the low pressure paths. Thus, the types of instances that might otherwise lead to cavitation problems are counteracted by the presence of the valve according to the first embodiment.

To summarize the subject matter of the first embodiment of FIG. 3, there is provided a hydraulic brake system for activating the wheel brakes of an aircraft landing gear assembly comprises a hydraulic fluid supply line and an associated return line. There is a valve which separates a source of hydraulic fluid from a portion of the return line and a leak path associated with the valve that in use maintains the pressure and/or volume of hydraulic fluid in the portion of the return line above a minimum acceptable level. The leak path may be provided by a hole drilled in a part (e.g. the poppet) of a non-return check valve. The leak path needs to be sized to be large enough to refill the lines that are cavitated, but small enough to prevent complete depletion of the circuit. The sizing may depend upon fluid behavior and aircraft environment, as well as aircraft hydraulic fluid consumption during different phases of the flight, but can readily be ascertained by modelling or routine testing and experimentation.

Figure 5:
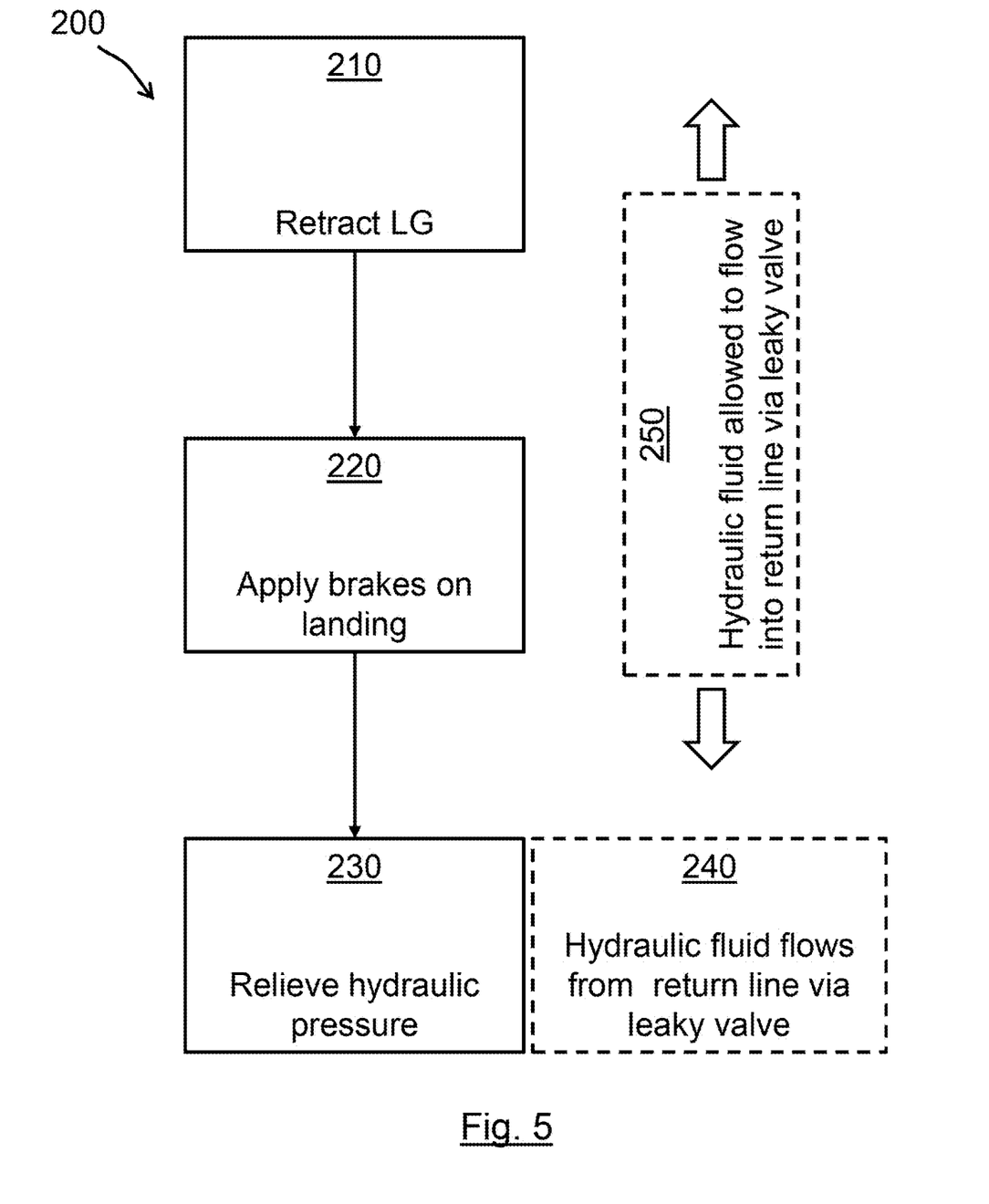
FIG. 5 shows an illustrative flow diagram of a method of an embodiment of the present disclosure.

FIG. 5 is a flow diagram 200 showing schematically a method of operating the brake system shown in FIG. 3. As mentioned above, the braking system forms part of a larger hydraulic system of the aircraft which shares a common reservoir of hydraulic fluid. The larger hydraulic system powers the landing gear retraction/extension for example. The method includes a step (represented by box 210) of retracting the landing gear. This involves high hydraulic loads which the braking system may not be 100% invulnerable to, such as for example loads that might act to suck fluid from parts of the braking system, particularly on the return line side. The method includes a step (the step being represented by box 220) of powering, with the use of hydraulic fluid under pressure supplied via the supply line of the braking system, the wheel brakes—for example on landing. The brakes are then commanded to release braking (or brake at reduced pressure) so that there is a need to relieve the hydraulic pressure at the brakes (represented by box 230). At this time, hydraulic fluid flows into and along the return lines (this being represented by box 240), with fluid being allowed to flow in the free-flow direction of the one-way leaky check valve. Particularly, but not exclusively, during a time (represented by box 250) in which the hydraulic fluid in the brake system is not powering the brakes, the leaky valve restricts, to a limited extent only, the flow of fluid in the opposite direction, thus allowing sufficient leakage in the opposite direction (the direction opposite to the free-flow direction) to reduce the risk of cavitation in the return line and/or to replenish any hydraulic fluid lost from the return line, for example during the LG retraction (210).

While the present disclosure has been described and illustrated with reference to particular embodiments, it will be appreciated by those of ordinary skill in the art that the present disclosure lends itself to many different variations not specifically illustrated herein. By way of example only, certain possible variations will now be described.

The above embodiment works by creating a small leak path through a check valve by drilling through the poppet, but other methods could be employed. For example, a leak path could be provided via a different part of the valve, for example via a part of the housing.

The larger hydraulic system of the aircraft may of course be provided to power other things in addition to, or instead of, the retraction of the landing gear. For example, it may power one or more flight control surfaces of the aircraft, one or more doors to the aircraft (whether passenger doors or landing gear bay doors or the like), nose landing gear steering, and/or an e-taxi system.

The flow rate of the leak path could be very low, and still provide benefit. If the main problems arising with cavitation of the brake system occur at the end of the flight with the main causes (landing gear retraction being an example) occurring at the start of the flight, and the typical scenario is that the return line becomes depleted but not completely empty of fluid, then it may be acceptable to have a flow rate along the leak path that fills 50% of the return line in, say, 10 hours, so a flow rate of 50% x 0.2 liters/10 hours=2.8× $10^{-6}$ liters/second=0.0028 ml/second=0.16 ml/minute, for the embodiment described above.

While the present embodiments have all been described in relation to dealing with the risks associated with cavitation in the return lines in a brake system for an aircraft, there may be applications in other hydraulic systems, where cavitation is a potential problem that could be remedied by replenishing hydraulic fluid in supply and/or return lines (and/or in lower pressure lines—or at times during which hydraulic lines are in a low pressure state) at a suitable time. Thus, more generally such embodiments may relate to the use of a leaky check valve (i.e. a valve for asymmetrical flow of fluid wherein flow in one direction is restricted, but not prevented, compared to an opposite direction permitting significantly higher flow rates) for keeping a flow line in a hydraulic system (or sub-system) adequately filled with hydraulic fluid, where that flow line might otherwise be prone to cavitation, for example as a result of the hydraulic system being a part of a larger hydraulic system which is arranged to be operated using high hydraulic loads, or other extremes, that make cavitation a likely risk, and for example despite the presence of check valves that would normally protect against such things.

Where in the foregoing description, integers or elements are mentioned which have known, obvious or foreseeable equivalents, then such equivalents are herein incorporated as if individually set forth. Reference should be made to the claims for determining the true scope of the present disclosure, which should be construed so as to encompass any such equivalents. It will also be appreciated by the reader that integers or features of the present disclosure that are described as preferable, advantageous, convenient or the like are optional and do not limit the scope of the independent claims. Moreover, it is to be understood that such optional integers or features, while of possible benefit in some embodiments of the present disclosure, may not be desirable, and may therefore be absent, in other embodiments.

The term 'or' shall be interpreted as 'and/or' unless the context requires otherwise.

It should be understood that modifications, substitutions and alternatives of the present invention(s) may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A hydraulic brake system for activating wheel brakes of an aircraft, the brake system comprising:
   a supply line for supplying hydraulic fluid to one or more of the wheel brakes that, when actuated by the hydraulic fluid, apply a braking force to one or more wheels of an aircraft landing gear assembly of the aircraft;
   a return line for return of the hydraulic fluid from the one or more wheel brakes; and
   a one-way check valve which separates a source of the hydraulic fluid from a portion of the return line, wherein the valve comprises a body and a valve member that cooperates with a valve seat when the valve is in a closed position;
   wherein there is a leak path associated with the valve;
   wherein the leak path is at least partly contained within the body of the valve;
   wherein the leak path is at least partly contained within the valve member; and
   wherein the hydraulic brake system and the leak path are configured such that, in use, a pressure and/or a volume of the hydraulic fluid in the portion of the return line is maintained above a minimum acceptable level as a result of flow of the hydraulic fluid to the return line via the leak path being sufficiently high to reduce a risk of cavitation in the return line but not so high as to risk unintentional loss of fluid from the hydraulic brake system to an extent that would prejudice safety.

2. The hydraulic brake system according to claim 1, wherein the valve is located in a part of the return line that is in direct fluid communication with a return line accumulator, such that a brake selector valve is located along a hydraulic fluid path between the valve and the brakes.

3. The hydraulic brake system according to claim 1, wherein:
   the hydraulic brake system is part of an aircraft; and
   the leak path is configured such that, during a longest flight achievable with the aircraft in normal operations, an amount of fluid able to flow in a single direction via the leak path would at most be less than a half of a maximum amount of the hydraulic fluid that could be safely lost.

4. The hydraulic brake system according to claim 1, wherein:
   the hydraulic brake system is part of an aircraft;
   the brake system is in fluid communication with a reservoir of the hydraulic fluid;
   the brake system forms part of a larger hydraulic system also in fluid communication with the reservoir of the hydraulic fluid;
   an average flow rate per second via the leak path associated with the valve is less than 0.00001 times a capacity of the larger hydraulic system including the reservoir of the hydraulic fluid.

5. The hydraulic brake system according to claim 1, wherein:
   the hydraulic brake system is part of an aircraft; and
   an average flow rate per second via the leak path associated with the valve is greater than 0.00001 times a capacity of the hydraulic fluid that the return line can hold.

6. The hydraulic brake system according to claim 1, wherein:
   the hydraulic brake system is part of an aircraft;
   the brake system is in fluid communication with a reservoir of the hydraulic fluid;
   the brake system forms part of a larger hydraulic system also in fluid communication with the reservoir of the hydraulic fluid;
   an average flow rate per second via the leak path associated with the valve is less than 0.00001 times a capacity of the larger hydraulic system including the reservoir of the hydraulic fluid; and
   the average flow rate per second via the leak path associated with the valve is greater than 0.00001 times a capacity of the hydraulic fluid that the return line can hold.

7. The hydraulic brake system according to claim 6, wherein the average flow rate per second via the leak path associated with the valve is less than a lowest safe value that can be used as a volume of the hydraulic fluid that can be lost in a single flight divided by a time of the longest flight likely to be taken by the aircraft in a lifetime of the aircraft.

8. The hydraulic brake system according to claim 7, wherein:
   the average flow rate per second via the leak path associated with the valve is greater than 0.0001 times the capacity of the hydraulic fluid that the return line can hold; and/or
   the average flow rate per second via the leak path associated with the valve is greater than 0.00000001 times the capacity of the larger hydraulic system including the reservoir of the hydraulic fluid.

9. An aircraft including the hydraulic brake system according to claim 1.

10. The aircraft according to claim 9, comprising:
    a larger hydraulic system; and
    a reservoir of the hydraulic fluid in fluid communication with both the hydraulic brake system and the larger hydraulic system;
    wherein the larger hydraulic system is configured for hydraulically powering at least one or more of:
    a control surface of the aircraft;
    deployment and/or stowage of a landing gear assembly and/or a door to the aircraft; and
    steering of, or powering of, a landing gear wheel.

11. A method of making the valve of claim 1, comprising drilling a hole in a valve member of the valve to create at least part of the leak path.

12. An aircraft including a hydraulic sub-system for supplying hydraulic power to wheel brakes of the aircraft, the hydraulic sub-system comprising:
    a one-way check valve which resists a flow of the hydraulic fluid in a first direction while allowing high flow rates of the hydraulic fluid in a second direction, the second direction being opposite to the first direction; and
    a leak path that allows a flow of the hydraulic fluid in the first direction, through the valve and/or bypassing the valve, at a rate that is sufficient to reduce a risk of cavitation in a portion of the hydraulic sub-system but low enough such that the check valve provides adequate protection where there is a faulty leak in the hydraulic sub-system such that both:
    the check valve, were there no intentional leak path, would have provided adequate protection against the faulty leak; and
    had the check valve included no restriction of flow of the hydraulic fluid in the first direction, the faulty leak would render the hydraulic sub-system inoperable.

13. A method of using a hydraulic brake system for activating wheel brakes of an aircraft, the hydraulic brake system forming part of a larger hydraulic system of the aircraft which shares a common reservoir of hydraulic fluid, the larger hydraulic system being used to power one or more parts of the aircraft that is not powered by the hydraulic brake system, the hydraulic brake system comprising:

a supply line for supplying the hydraulic fluid under high pressure to one or more hydraulic powered wheel brakes that, when actuated by the hydraulic fluid, apply a braking force to the one or more hydraulic powered wheel brakes of an aircraft landing gear assembly of the aircraft;

a return line for returning the hydraulic fluid from the one or more hydraulic powered wheel brakes; and a valve for controlling a flow of the hydraulic fluid within the hydraulic brake system;

wherein the valve is a one-way check valve;

the method comprising:

powering, with use of the hydraulic fluid under pressure supplied via the supply line, the one or more hydraulic powered brakes and then relieving hydraulic pressure, during which the hydraulic fluid flows in one direction via the valve; and a step, during which the hydraulic fluid in the hydraulic brake system is not powering the one or more hydraulic powered wheel brakes, in which the valve resists flow of the hydraulic fluid in an opposite direction while allowing sufficient leakage of the hydraulic fluid in the opposite direction to reduce a risk of cavitation in the return line when the hydraulic brake system is used to power the one or more hydraulic powered wheel brakes, the rate of leakage being sufficiently low as to not risk unintentional loss of the hydraulic fluid from the hydraulic brake system to an extent that would prejudice safety.

14. The method according to claim 13, wherein the larger hydraulic system is configured for hydraulically powering one or more of:

a control surface of the aircraft;

deployment and/or stowage of a landing gear assembly and/or a door to the aircraft; and steering of, or powering of, a landing gear wheel.

15. The method according to claim 13, wherein the brake system comprises a leak path associated with the valve that, in use, maintains a pressure and/or volume of the hydraulic fluid in the portion of the return line above a minimum acceptable level.

16. The method according to claim 13, performed on an aircraft, the aircraft comprising a hydraulic sub-system for supplying hydraulic power to a part of the aircraft, the hydraulic sub-system comprising:

a one-way check valve which resists a flow of the hydraulic fluid in a first direction through the valve, while allowing high flow rates of the hydraulic fluid in a second direction through the valve, the second direction being opposite to the first direction; and a leak path that allows a flow of the hydraulic fluid in the first direction, through the valve and/or bypassing the valve, at a rate that is sufficient to reduce a risk of cavitation in a portion of the hydraulic sub-system but low enough such that the check valve provides adequate protection where there is a faulty leak in the hydraulic sub-system, such that both:

the check valve, were there no intentional leak path, would have provided adequate protection against the faulty leak; and had the check valve included no restriction of flow of the hydraulic fluid in the first direction, the faulty leak would render the hydraulic sub-system inoperable.

* * * * *